United States Patent [19]

Sakakibara et al.

[11] 4,404,423
[45] Sep. 13, 1983

[54] THREE-PHASE GAS INSULATED BUS

[75] Inventors: Takaaki Sakakibara; Yoshihiro Kanno, both of Yokohama, Japan

[73] Assignee: Tokyo Shibaura Denki Kabushiki Kaisha, Kawasaki, Japan

[21] Appl. No.: 305,225

[22] Filed: Sep. 24, 1981

[30] Foreign Application Priority Data

Sep. 24, 1980 [JP] Japan .................. 55-134688[U]

[51] Int. Cl.³ ............................................ H02G 5/06
[52] U.S. Cl. ...................................... 174/27; 174/99 B
[58] Field of Search ................. 174/16 B, 27, 99 R, 174/99 B, 99 E, 149 B

[56] References Cited

U.S. PATENT DOCUMENTS

| 3,349,168 | 10/1967 | Rehder et al. | 174/99 B |
| 3,751,578 | 8/1973 | Hoffmann | 174/16 B X |
| 4,316,052 | 2/1982 | Matsuda | 174/99 B X |

FOREIGN PATENT DOCUMENTS

| 2036270 | 1/1972 | Fed. Rep. of Germany | 174/27 |
| 2316100 | 10/1974 | Fed. Rep. of Germany | 174/99 B |
| 1448008 | 6/1966 | France | 174/99 B |
| 15955 | 1/1898 | Switzerland | 174/27 |

OTHER PUBLICATIONS

Eidinger, A., "Design, Application and Testing of SF₆ Insulated Cable", *Brown, Boveri Review*, vol. 63, No. 11, Nov. 1976, pp. 688–694.

Szente-Varga, H. P., "Metalclad Switchgear with SF₆ Insulation for 72 to 525 Kv", *Brown, Boveri Review*, No. 11/12, 1969, pp. 570–580.

Mitsubishi Denki Giho, vol. 54, No. 9, 1980, pp. 41–45.

*Primary Examiner*—Laramie E. Askin
*Attorney, Agent, or Firm*—Oblon, Fisher, Spivak, McClelland & Maier

[57] ABSTRACT

A three-phase gas insulated bus has three high voltage conductors inside a grounded cylindrical metal sheath filled with an insulating gas. The conductors are integrally supported by a single spacer having three supporting parts. The spacer is radially slidably coupled with the inner wall of the sheath.

3 Claims, 1 Drawing Figure

U.S. Patent   Sep. 13, 1983   4,404,423
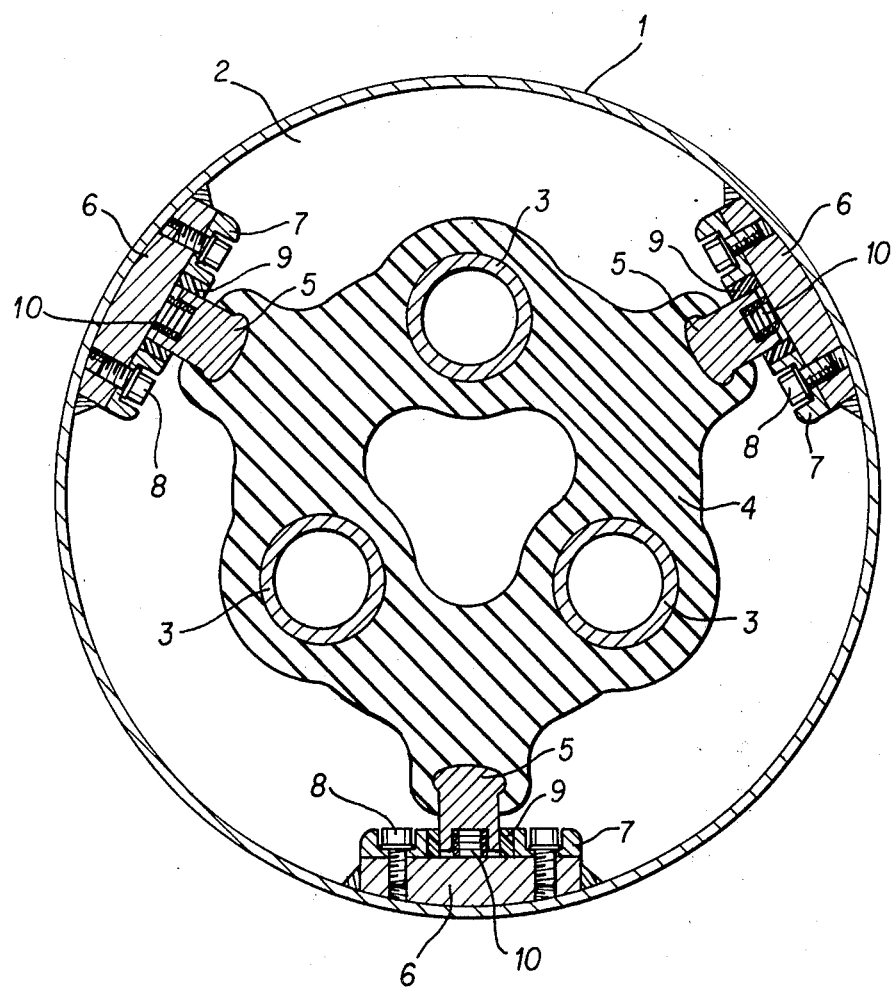

THREE-PHASE GAS INSULATED BUS

BACKGROUND OF THE INVENTION

1. Field of the Invention

The present invention relates to a three-phase gas insulated bus and more particularly to an improvement in an insulating spacer for supporting three three-phase conductors inside a grounded metal sheath.

2. Description of the Prior Art

A conventional gas insulated bus in general includes a grounded cylindrical metal sheath, high voltage conductors arranged inside the sheath, an insulating spacer for supporting the conductors apart from the sheath, and an insulating gas such as sulfur hexafluoride (SF6) sealed within the sheath.

In case it is not desired to gas-tightly separate portions of the grounded metal sheath by the insulating spacer, a pillar-shaped insulating spacer or an integrally molded insulating spacer has mainly been used.

The pillar-shaped insulating spacer is mounted on the inner wall of the sheath and individually supports each of the three three-phase conductors. The integrally molded insulating spacer integrally insulatingly supports three high voltage conductors and is fixed on the inner wall of the sheath at a plurality of extending portions of the spacer.

However, the grounded cylindrical metal sheath is not exactly circular in shape when the sheath is manufactured. Since the manufactured sheath becomes approximately circular in shape when high pressure insulating gas is introduced into the sheath, the configuration of the sheath varies before and after gas filling.

In the pillar-shaped insulating spacer, hardly any stress is applied to the spacer, even if the cylindrical metal sheath is deformed. The distances between each of the conductors shift as the sheath is deformed.

On the other hand, in the integrally molded insulating spacer, the supporting parts of the spacer are firmly fixed on the inner wall of the sheath. As a result, large stresses are generated in the spacer by deformation of the sheath during gas-filling, and the spacer is destroyed or suffers from shortening of its life.

SUMMARY OF THE INVENTION

Accordingly, it is one object of this invention to provide a new and improved three-phase gas insulating bus device wherein an insulating spacer supporting three three-phase conductors is not affected by deformation of the sheath.

Briefly, in accordance with one aspect of this invention, a three-phase gas insulating bus device has three high voltage conductors inside a grounded cylindrical metal sheath filled with an insulating gas. The conductors are integrally supported by a single spacer having three supporting parts. The spacer is radially slidably coupled with the inner wall of the sheath.

BRIEF DESCRIPTION OF THE DRAWINGS

A more complete appreciation of the invention will be readily obtained as the same becomes better understood by reference to the following detailed description when considered in connection with the accompanying drawings, wherein:

The FIGURE is a sectional view of the three-phase gas insulating bus device according to this invention.

DETAILED DESCRIPTION OF THE PREFERRED EMBODIMENTS

Referring now to the FIGURE, one preferred embodiment of a three-phase gas insulating bus device in accordance with this invention is shown as including three high voltage conductors 3 arranged inside a grounded cylindrical metal sheath 1 filled with an insulating gas 2, for instance SF6.

The three high voltage conductors 3 are integrally supported by an insulating spacer 4 so as to position each of conductors 3 at the respective vertices of a triangle as seen in section. Between each pair of adjacent conductors 3, the spacer 4 includes electrically conductive supporting parts 5 which extend outwardly and are integrally molded or embedded in spacer 4. Each of the supporting parts 5 is disposed apart from the other parts 5 by a 120 degree angle.

A ring member 7, radially slidably holds the supporting parts 5 via a low friction buffering member 9 which may for instance be a ring formed of a fluorine resin, such as one known by the trademark Teflon. The ring member 7 is mounted on a boss member 6 by bolts 8. The boss member 6 is attached to the inner wall of the sheath by fixing means such as welding, screwing, etc.

In order to electrically connect between the supporting parts 5 and the boss member 6 (i.e. a grounded sheath), a spring 10 is provided between the recess of the supporting parts 5 and the boss member 6.

Thus, the electrical potential of the supporting parts 5 is always maintained at the grounded potential of the sheath. Although the potential gradient close to the supporting parts 5 embedded in spacer 4 becomes high, the dielectric strength in the spacer 4 near supporting parts 5 is maintained due to the high dielectric strength of the spacer material itself.

On the other hand, by providing the grounded supporting parts 5 in the spacer 4, the dielectric strength requirement in the vicinity of the ring member 7 placed in gas, is lessened. As a result, it is possible to prevent the occurrence of dielectric breakdown in the gas insulated bus because the position of high dielectric strength requirement is moved from a position in gas to a position in the insulator.

It should now be apparent, in accordance with the teachings of the present invention, that since the spacer 4 is radially-slidably mounted on the inner wall of the sheath due to the sliding contact between supporting parts and low friction members 9, the transmission of undesired force to the connecting portion between the spacer and the sheath is prevented or absorbed even if the sheath is deformed by being filled with an insulating gas.

Moreover, it is possible to apply electric power to the high voltage conductors without applying mechanical force to the conductors, as compared with the prior type spacer which is rigidly supported on the inner wall of the sheath. As a result, heating of a portion of the conductor due to mechanical force applied during the applying of electric power is prevented.

Furthermore, according to this invention, it is possible to provide a three-phase gas insulated bus which can be easily assembled with few parts and which can absorb undesired force generated when a fault in the conductors occurs.

Thus, although the invention has been explained by way of example with the employment of a spacer with three supporting parts, it should be apparent that if desired, the spacer with two supporting parts could be applied.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A gas insulated bus having high voltage conductors inside a grounded cylindrical metal sheath filled with an insulating gas, comprising:
   three, three-phase conductors arranged inside said sheath, each said conductor located at a respective vertex of a triangle within said sheath as seen in section;
   an insulating means formed integrally about all of said conductors for supporting said conductors within said sheath, said insulating means including at least two leg portions, each said leg portion having a supporting part;
   fitting means fixed on the inner wall of said sheath for radially-slidably supporting each of said leg portions of said insulating means, said fitting means being electrically connected to each said supporting part of said insulating means; and
   buffering means mounted between said supporting part of said insulating means and said fitting means for absorbing deformations of said sheath, said buffering means having a low friction characteristic,
   wherein said fitting means and buffering means are annular and concentric, said supporting part being concentrically fitted into said buffering means.

2. The gas insulated bus of claim 1, wherein said insulating gas is sulfur hexafluoride.

3. The gas insulated bus of claim 1, wherein said supporting parts of said insulating means are formed of an electrically conductive material.

* * * * *